3,074,970
ESTERS OF N-FURFURYLDITHIOCARBAMIC ACIDS AND VEGETATION CONTROL
Marion W. Harman, Nitro, and John J. D'Amico, Charleston, W. Va., assignors to Monsanto Chemical Company, St. Louis, Mo., a corporation of Delaware
No Drawing. Filed Nov. 17, 1959, Ser. No. 853,469
8 Claims. (Cl. 260—347.2)

The present invention provides esters of N-furfuryldithiocarbamic acids, a method of producing the same, herbicidal compositions comprising the new compounds and methods of destroying or controlling vegetation employing such herbicidal compositions.

The compounds of this invention are characterized by the following general formula:

where A is a furfuryl radical such as furfuryl and tetrahydrofurfuryl, R and X are alkyl or alkenyl radicals of less than five carbon atoms.

Compounds having the above general formula are readily obtainable in known manner by condensing an alkali metal salt of a dithiocarbamic acid with the appropriate lower alkyl or lower alkenyl halide. A specific process applicable for the preparation of the compounds of this invention is as follows:

A solution was prepared by dissolving 14.3 grams (0.1 mole) of N-isopropyl N-tetrahydrofurfurylamine in 100 ml. of water containing 16 grams (0.1 mole) of 25% sodium hydroxide. To this solution, while agitating, was added dropwise at 5–15° C. 7.6 grams (0.1 mole) of carbon bisulfide. After stirring for an hour at 25–30° C., 7.6 grams (0.1 mole) of allyl chloride was added in one portion and the stirred reaction mixture heated at 50–60° C. for 4 hours. After cooling to 25° C., the reaction mixture was extracted with 300 ml. of ethyl ether, the ether solution washed with water until neutral to litmus, drier over sodium sulfate and the ether removed in vacuo at a maximum temperature of 80–90° C./10–12 mm. Allyl N-isopropyl N-tetrahydrofurfuryldithiocarbamate was obtained in 96.4% yield as an amber liquid analyzing 5.2% nitrogen and 24.9% sulfur as compared to 5.4% nitrogen and 24.7% sulfur calculated for $C_{14}H_{21}NOS_2$.

Further examples of the toxicants comprise ethyl N-ethyl N-tetrahydrofurfuryldithiocarbamate, propyl N-ethyl N-tetrahydrofurfuryldithiocarbamate, propyl N-propyl N-tetrahydrofurfuryldithiocarbamate, propyl N-butyl N-tetrahydrofurfuryldithiocarbamate, propyl N-allyl N-tetrahydrofurfuryldithiocarbamate, allyl N-butyl N-tetrahydrofurfuryldithiocarbamate, allyl N-allyl N-tetrahydrofurfuryldithiocarbamate, ethyl N-ethyl N-furfuryldithiocarbamate, propyl N-butyl N-furfuryldithiocarbamate and allyl N-butyl N-furfuryldithiocarbamate.

For the control of unwanted vegetation the toxicants may be applied full strength to the soil medium but preferably in conjunction with a herbicidal adjuvant as carrier in order to provide formulations adapted for ready and efficient application in liquid or solid form. The active ingredient will ordinarily be present in a concentration within the range of 0.1–50.0%. The compounds are liquids insoluble in water but readily soluble in organic solvents including petroleum fractions. Whether applied in conjunction with a carrier or not, admixture with a small amount of an organic surface active agent capable of lowering the surface tension of water is desirable for field application. Solid formulations are formulated by mixing the toxicant with a finely divided or granular solid, as for example talc, clay, pyrophyllite, silica and fuller's earth. To apply as aqueous sprays the esters may be dispersed directly in water or dissolved first in an organic solvent and then dispersed. As organic surface active agents there may be employed soft or hard sodium or potassium soaps, morpholine or dimethylamine oleate, sulfonated fish, castor or petroleum oils, sodium salt of lignin sulfonic acid, alkylated aromatic sodium sulfonates such as sodium dodecylbenzenesulfonate, sodium decylbenzenesulfonate, butyl or other amine salt of decylbenzenesulfonic acid or dodecylbenzenesulfonic acid, alkali metal salts of sulfated fatty alcohols as for example, sodium lauryl sulfate, ethylene oxide condensation products of alkyl phenols or tall oil, ethylene oxide condensation products of higher mercaptans or higher alcohols. Mixtures of two or more surface active agents are also feasible. Generally the surface active agent will comprise only a small proportion of the composition, say 0.1–15% by weight of the ester.

Pre-emergent herbicides are applied to the soil surface before the plants emerge. The toxicants may be applied to the soil conveniently in the form of a spray containing the active ingredient in a concentration within the range of 0.1–10% by weight. The amount required for effective control of vegetation will vary but amounts within the range of ¼ to 60 pounds per acre comprise the useful range under most conditions. Examples of grasses which are controlled are foxtail, brome grass, wild oats, rye grass, sorghum and crab grass. Weeds from the following plant families are controlled to varying degrees: Leguminaseae, Cucurbitaceae, Umbellifereae, Chenopodiaceae, Amaranthaceae, Convolvulaceae and Aizoaceae.

As illustrative of the invention the toxicants were applied as aqueous sprays to a variety of germinating seedlings. The active ingredient was emulsified in water and applied to seeded soil at the rate of 25 pounds per acre. About fourteen days after application of the toxicants results were observed and recorded. The number of seeds emerging was converted to weighted herbicidal ratings based on average percent germination of any particular seed lots times an injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

| Percent Emergence | Phytotoxicity Rating |
|---|---|
| 0–25 | severe. |
| 26–50 | moderate. |
| 51–75 | slight. |
| 76–100 | none. |

The phytotoxicities are recorded below:

Table I

| Toxicant | Phytotoxicity |
|---|---|
| Allyl N-isopropyl N-tetrahydrofurfuryldithiocarbamate. | Severe phytotoxicity to a mixture of grasses, wild oats, brome grass, rye grass, foxtail, crab grass, pigweed and sorghum; moderate phytotoxicity to sugar beets. |
| Allyl N-butyl N-furfuryldithiocarbamate. | Severe phytotoxicity to a mixture of grasses, wild oats, rye grass, foxtail, crab grass, pigweed and sorghum; moderate phytotoxicity to morning glory and brome grass. |
| Allyl N-butyl N - tetrahydrofurfuryldithiocarbamate. | Severe phytotoxicity to foxtail and sorghum; moderate phytotoxicity to wild oats, rye grass, crab grass and pigweed. |

What is claimed is:

1. A compound of the structure

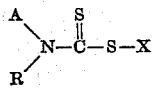

where A is a radical selected from the group consisting of furfuryl and tetrahydrofurfuryl, R and X are selected from a group consisting of alkyl of 1 to 4 carbon atoms and alkenyl of 1 to 4 carbon atoms.

2. A compound of the structure

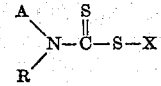

where A is furfuryl, R is alkyl of 1 to 4 carbon atoms and X is alkenyl of 1 to 4 carbon atoms.

3. A compound of the structure

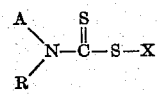

where A is tetrahydrofurfuryl, R is alkyl of 1 to 4 carbon atoms and X is alkenyl of 1 to 4 carbon atoms.

4. A compound of the structure

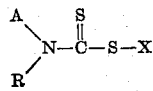

where A is furfuryl and R and X are alkyl of 1 to 4 carbon atoms.

5. A compound of the structure

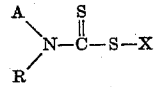

where A is tetrahydrofurfuryl and R and X are alkyl of 1 to 4 carbon atoms.

6. Allyl N-isopropyl N-tetrahydrofurfuryldithiocarbamate.
7. Allyl N-butyl N-tetrahydrofurfuryldithiocarbamate.
8. Allyl N-butyl N-furfuryldithiocarbamate.

References Cited in the file of this patent

UNITED STATES PATENTS

| | | |
|---|---|---|
| 2,670,282 | Allen | Feb. 23, 1954 |
| 2,744,898 | Harman et al. | May 8, 1956 |
| 2,757,174 | Hardman | July 31, 1956 |
| 2,787,621 | Hook et al. | Apr. 2, 1957 |
| 2,788,351 | Leonard et al. | Apr. 9, 1957 |
| 2,847,419 | Harman | Aug. 12, 1958 |
| 2,887,372 | Tilles et al. | May 19, 1959 |